Dec. 24, 1946.  W. U. HOHWIELER  2,413,230
PARACHUTE DUMMY
Filed Sept. 9, 1944　　2 Sheets-Sheet 1

INVENTOR.
WILLIAM U. HOHWIELER
BY Albert Sperry.
ATTORNEY

Dec. 24, 1946.  W. U. HOHWIELER  2,413,230

PARACHUTE DUMMY

Filed Sept. 9, 1944  2 Sheets-Sheet 2

INVENTOR.
WILLIAM U. HOHWIELER
BY

*Albert Sperry.*

ATTORNEY

Patented Dec. 24, 1946

2,413,230

UNITED STATES PATENT OFFICE 2,413,230

PARACHUTE DUMMY

William U. Hohwieler, Morrisville, Pa.

Application September 9, 1944, Serial No. 553,451

7 Claims. (Cl. 35—25)

My invention relates to parachute dummies of the type used in testing parachutes and for conducting experimental work in connection with aviation. In particular my invention relates to parachute dummies which are so constructed and balanced that they will withstand great shock and will fall in a desired manner to simulate the action of the human body.

Parachute dummies heretofore used in testing parachutes frequently have been of a crude or makeshift construction and have often embodied nothing more than a mass of heavy chains fastened together. Other dummies have been formed of wood, metal or weighted rubber, but since they frequently strike the ground with great impact, particularly if the parachute being tested fails to open, the dummies are often injured and have a very short life. Moreover, prior parachute dummies have generally lacked proper balance corresponding to that of a person and as a result they often tend to plunge head downward or tumble about when falling or may become entangled with the suspension lines or injure the parachute itself. Furthermore, parachute dummies of the prior art have not been formed so that the weight of the dummy could be varied or the center of gravity changed and there have been no means for housing or supporting instruments for recording the conditions of fall. Therefore they have not been capable of use in conducting research and experimental work on parachutes.

One of the objects of my invention is to provide a novel type of parachute dummy which is resistant to impact and capable of being used for repeated tests.

Another object of my invention is to provide a parachute dummy which may be varied in weight and in which the location of the center of gravity can be changed as desired.

A further object of my invention is to provide a parachute dummy with means for housing instruments or the like for use in recording the conditions of fall.

These and other objects of my invention will appear from the following description thereof in which reference is made to the figures of the accompanying drawings.

Figure 1:
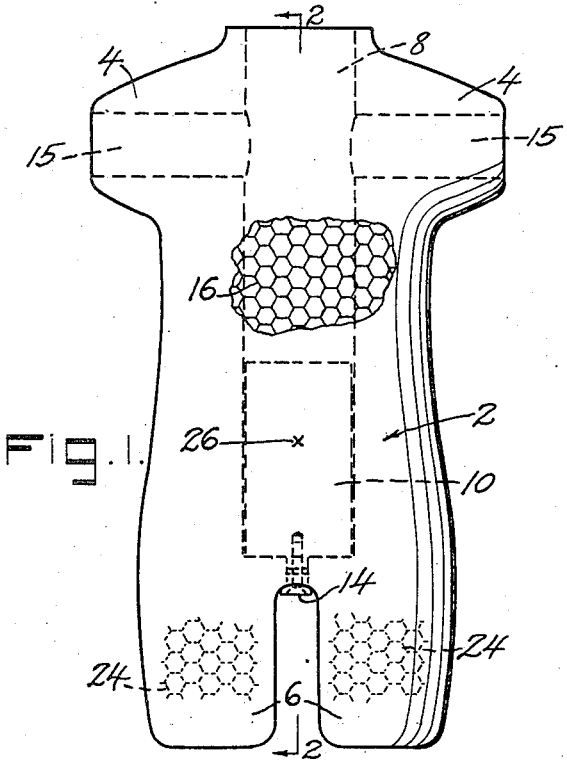
Fig. 1 is a view in front elevation of a typical form of parachute dummy embodying my invention, with parts thereof broken away.
Figure 2:
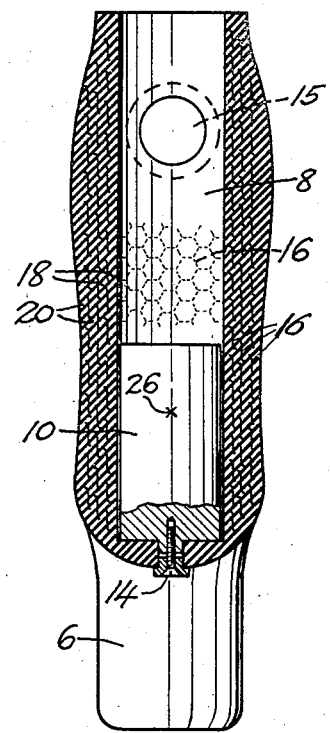
Fig. 2 is a vertical sectional view of the construction shown in Fig. 1 taken on the line 2—2 thereof.
Figure 3:
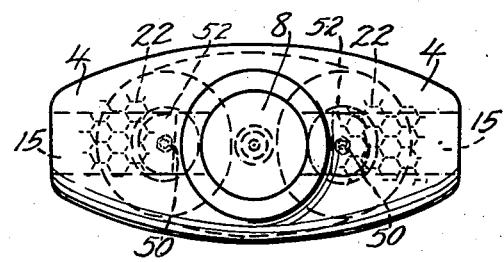
Fig. 3 is a top plan view of the construction shown in Fig. 1.

In that form of my invention illustrated in Figs. 1, 2 and 3 the dummy is in the shape of the torso of a person's body and has a central body portion 2, arm portions 4, and leg portions 6. The body is provided with a central recess 8 which extends downward from the neck of the dummy to a point located adjacent the leg portion 6 so as to provide relatively large space for receiving a weighting member 10. As shown the weighting member is secured in place by a bolt 14 which extends upwardly into the body between the leg portions 6 and is threaded to engage a threaded recess in the weighting member 10. This member may be formed in separate sections adapted to be connected together or different weight members may be provided to vary the location of the center of gravity and the total weight of the dummy as desired.

A transversely extending opening 15 extends through the arm portions 4 of the dummy and communicates with the central recess 8 so that a bar, cable or other attaching means may be passed through the arm portions when it is desirable to support the dummy from a point adjacent the arm portions thereof.

The dummy is preferably formed of hard or semi-hard rubber and a plurality of layers of perforated metal or reinforcing material, such as wire screen, are arranged within the body as shown at 16 and preferably are in successive layers as shown in Fig. 2 extending generally parallel with the outer surface of the body. Between the layers of wire screen are located layers of rubber 18 and 20 and in practice the layers 18 adjacent the central opening 8 are formed of a rubber stock that will vulcanize more rapidly than the layers of stock 20 adjacent the outer surface of the body. In this way the dummy may be made substantially the size of the human body and even though several inches thick the rubber will be vulcanized substantially uniformly so as to produce a tough, hard body reinforced effectively to withstand the terrific shocks incident to the use of the dummy. In addition to the layers of wire mesh or perforated metal 16 which extend longitudinally of the dummy other layers of wire mesh or reinforcing material may be located in the arm portions 4 and extend about the openings 15 as shown at 22 so as to reinforce the arms of the dummy. The lower parts of the wire screen 16 may be formed to extend into the legs of the dummy as indicated at 24 or additional reinforcing material may be be located to insure adequate strength in all parts of the dummy.

With this construction a dummy formed of hard rubber and suitably reinforced may be weighted to various extents so that the dummy may have any desired total weight and the center of gravity of the dummy may be located near the lower portion thereof and approximately at the point 26 in Figs. 1 and 2 so that when the dummy is dropped with a parachute it will fall with the leg portions downward and will swing in substantially the same manner as the human body thus giving an accurate simulation of conditions of actual use. When it is desired to vary the weight of the dummy it is only necessary to disconnect the bolt 14 from the weight 10 and to substitute a different weight suitable for making other tests to simulate alternative conditions of use.

The location of the center of gravity of the dummy and the reinforcing of the body are such that the construction will withstand severe shock and will not be broken even though the parachute may fail to open. The yielding character of the wire screen used in reinforcing the dummy also serves to provide great strength and adequate flexibility to permit limited distortion of the dummy when it strikes the ground. In this way the construction overcomes any tendency for the reinforcing material and rubber to tear apart or be cut or broken under the force of any blows to which the dummy may be subjected.

Figure 4:
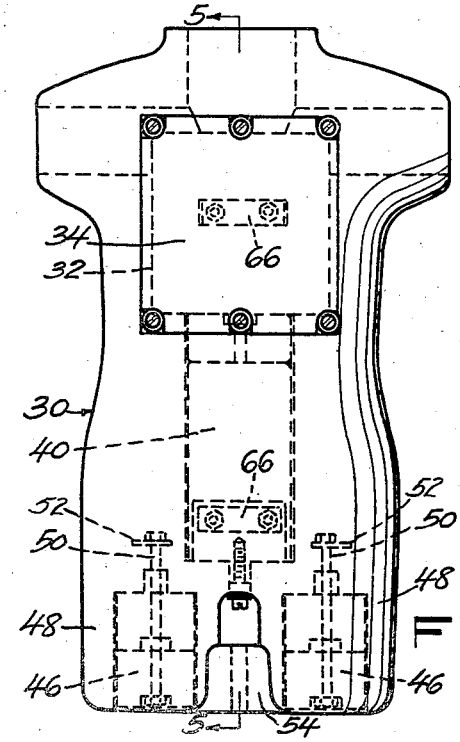
Fig. 4 is a front elevation of an alternative form of parachute dummy embodying my invention.
Figure 5:
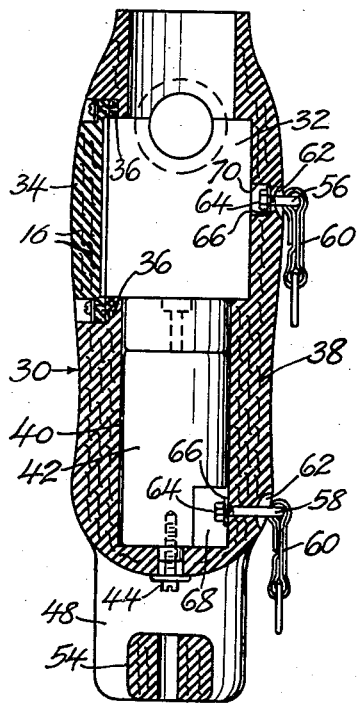
Fig. 5 is a vertical sectional view of the dummy shown in Fig. 4 taken on the line 5—5 thereof.

In that form of my invention illustrated in Figs. 4 and 5 the parachute dummy has the same general form as that illustrated in Figs. 1, 2 and 3. However in this construction the body 30 is provided with an enlarged central cavity 32 within which may be located instruments for indicating the deceleration due to shock loading of the parachute and for indicating the force of the impact when the dummy strikes the ground. In addition to such instruments, timing and temperature indicators may be used and other equipment employed for determining the actual conditions and forces to which an aviator is subjected when using a parachute at different altitudes and when escaping from an airplane travling at different speeds. Information of this character is of the utmost importance in designing parachutes, harness and equipment, particularly for use by paratroopers and for other war purposes.

The cavity 32 is located in the chest portion of the body and is provided with a lateral opening adapted to receive a closure member 34. Bolt carrying plates 36 are molded into the body adjacent the lateral opening in the cavity 32 to receive and hold the cover member 34 in place. The body is reinforced with wire mesh screen or perforated metal as shown at 38 and is also provided with the central recess 40 for receiving a weight 42 adapted to be held in place by a bolt 44. In this way the center of gravity of the dummy may be so positioned as to insure proper weighting and fall thereof to simulate those conditions encountered by aviators when using parachutes.

As illustrated in Figs. 3 and 4 the dummy may also be provided with weighted elements 46 located in the leg portions 48 of the dummy and these may be secured in place by bolts 50 engageable with plates 52 imbedded in the body of the dummy. Furthermore the lower extremities of the leg portions 46 of the dummy may be laterally reinforced by means of a connecting member or web 54 so as to further strengthen the construction and be sure the dummy will not split and the leg portions 48 will not be broken even though the dummy is subjected to the severest impacts during its use.

As illustrated in Fig. 5 the dummy is further provided with a U-bolt 56 located near the chest portion of the dummy and a U-bolt 58 located near the seat portion of the dummy whereby attaching members 60 corresponding to the attaching elements of the parachute harness may be secured to the dummy for use in connecting the dummy to a parachute and for holding the dummy in predetermined positions with respect to the parachute or equipment being tested. In order to prevent such projecting element as the U-bolt 56 and 58 from rupturing or injuring the body in the event that they should be struck forcibly when the dummy hits the ground it is preferable to support these U-bolts so that they are relatively movable with respect to the body and depressions 62 are formed in the outer surface of the body to permit the U-bolt to be forced inward toward the cavity 32 and the recess 40 in the center of the parachute dummy and housed or protected by the body of the dummy. The inner ends of the U-bolts are provided with nuts 64 which engage a plate 66 that ties the free ends of the U-bolts together and forms an abutment limiting the outward movement of the U-bolt.

With this construction the weight 42 in the recess 40 in the lower portion of the body of the dummy is provided with a cut-out portion indicated at 68 into which the U-bolt 58 and nut 64 may move in the event the U-bolt is struck when the dummy hits the ground. In the alternative as shown in connection with the cavity 32 in the upper portion of the body a recess 70 may be formed in the body of the dummy itself and made sufficiently deep to permit the U-bolt to move relative to the body when struck without projecting inward far enough to injure any apparatus or equipment located within the cavity 32.

This construction is particularly adapted for use in conducting research work and experimental work and has proved of great value in determining the actual conditions and forces to which aviators are subjected when using parachutes under varying conditions or altitude, speed, temperature and the like. At the same time the dummy possesses the requisite strength and rigidity to withstand the shocks to which such dummies are subjected and may be used over and over again while at the same time the instruments carried thereby are protected from injury.

Figure 6:
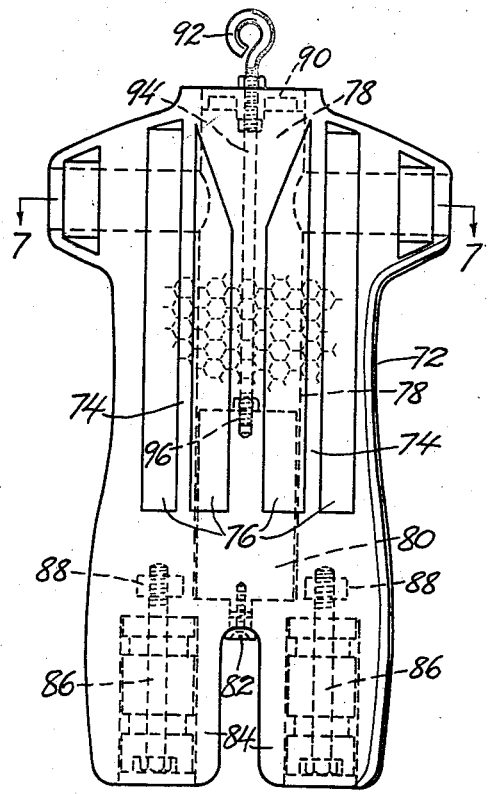
Fig. 6 is a front elevation of a further alternative embodiment of my invention.
Figure 7:
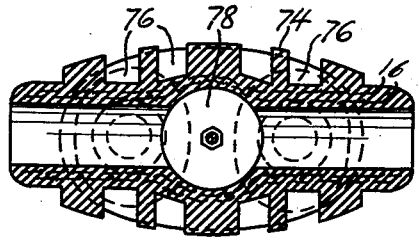
Fig. 7 is a horizontal sectional view taken on the line 7—7 of Fig. 6.

In that form of my invention illustrated in Figs. 6 and 7 an alternative type of parachute dummy is illustrated which is particularly designed for conducting tests wherein the center of gravity of the dummy should be as low as possible. For this purpose the upper portion of the dummy is formed with cut-out portions which reduce the weight of the chest and shoulder simulating parts of the dummy. Thus as illustrating the upper portion 72 of the dummy is formed with reinforcing ribs 74 separated by slots 76 of a suitable width and depth to reduce illustrated the upper portion 72 of the dummy The dummy is provided with the central recess 78 which extends to a point below the lower ends of the slots 76 and a weight 80 is located in the recess and secured in place by the bolt 82.

In this construction, as in that of Figs. 4 and 5, the leg portions 84 are provided with variable weights which are held in place by the bolts 86 threaded into plates 88 located in the body of the dummy.

A further feature of my invention illustrated in Fig. 6 resides in the provision of a plate 90 which closes the upper end of the central recess 78 in the body and carries an eye 92 by which the dummy may be suspended when it is desired to support the dummy from the highest possible point. A rod 94 which may conveniently be threaded into the plate 90 is formed at its lower end with a threaded portion 96 engaging the weight 80 so that the closure plate 90 is held firmly in place and the eye 92 is further connected to the weight 80 and the dummy through the plate 90, the rod 94, the weight 80 and the bolt 82.

Figure 8:
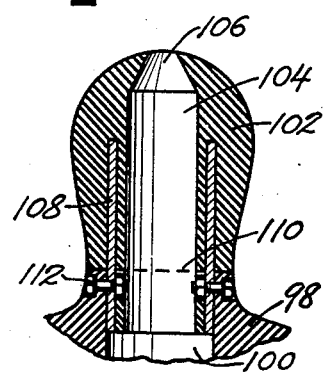
Fig. 8 is a vertical sectional view of a portion of a further modified form of my invention.

As illustrated in Fig. 8 the dummy may be provided with a head to further simulate the form of a user's body and while the head may be formed integral with the body it is preferable to form the head separable and to provide a recess therein in which instruments may be housed. As shown in Fig. 8 the body of the dummy 98 is formed with a central recess 100 whereas the head 102 is formed with a smaller recess 104. The latter recess preferably is open at the top as indicated at 106 in order that air may pass into the dummy for actuating temperature and pressure responsive instruments. The head is formed with a sleeve 108 which projects downwardly below the base 110 of the head so as to extend into the recess 100 in the neck of the body 98. Bolts or other attaching means 112 pass through the neck of the dummy and engage the sleeve 108 to secure the head firmly in place.

Heads of this character may be applied to any of the forms of dummy illustrated or embodying my invention and are readily removed from one dummy and applied to another as desired.

In each of the constructions shown and described the body is preferably formed of hard or semi-hard rubber suitably vulcanized so as to be substantially uniform throughout, and is reinforced through the body, legs and arms to withstand the blows and impacts to which a dummy may be subjected in use. At the same time the total weight of the dummy and the distribution of the weight throughout the same may be varied to simulate any operating conditions. The dummy may be used repeatedly without injury or rupture thereof and uniform standards may be maintained for conducting successive tests even when using different dummies.

It will be apparent that any of the dummies shown and described in my invention may be suspended or connected to a parachute or other equipment by any of the various means disclosed. Moreover the various weights employed and the shape and location of the cavities within the body may be changed in form and construction to provide any total weight and to locate the center of gravity in any position necessary to simulate any desired or varying operating conditions. It will also be evident that the particular type and arrangement of the reinforcing means and composition of the body may be constructed in numerous ways. In view thereof it should be understood that the particular forms of parachute dummies embodying my invention herein shown and described are intended to be illustrative only and are not intended to limit the scope of my invention.

I claim:

1. A parachute dummy in the shape of the torso of a person's body and formed of rubber reinforced with perforate metal members arranged in a plurality of layers extending generally parallel with the outer surface of the dummy and imbedded in the rubber thereof and portions of said rubber intervening between said layers.

2. A parachute dummy in the shape of the torso of a person's body and formed of rubber reinforced with wire screen arranged in a plurality of layers extending generally parallel with the outer surface of the dummy and imbedded in the rubber thereof and portions of said rubber intervening between said layers.

3. A parachute dummy in the shape of the torso of a person's body and having an opening extending transversely of the body through the arms thereof for receiving means for supporting the body in an erect position, said body having a central recess therein extending downward from the neck of the body, and a weighting member formed to pass through the neck of the body into said central recess below the opening which passes transversely through the arms of the body.

4. A parachute dummy in the shape of the torso of a person's body and having an opening extending transversely of the body through the arms thereof for receiving means for supporting the body in an erect position, said body having a central recess therein extending downward from the neck of the body, and a weighting member formed to pass through the neck of the body into said central recess below the opening which passes transversely through the arms of the body, and a bolt extending upward from the lower portion of said body and into said recess for engaging the weighting member to hold it in place.

5. A parachute dummy in the shape of the torso of a person's body and having an opening extending transversely of the body through the arms thereof for receiving means for supporting the body in an erect position, said body having a central recess therein extending downward from the neck of the body, and a weighting member formed to pass through the neck of the body into said central recess below the opening which passes transversely through the arms of the body, said body having leg portions at the lower extremity thereof and weighting members located in said leg portions.

6. A parachute dummy in the shape of the torso of a person's body and having a centrally located recess therein, supporting members including means located on the exterior of the body for attaching the dummy to a parachute and means located in said recess for securing the supporting members to the dummy, said supporting members being movable with respect to the body, the outer surface of the body being formed with depressions for housing that portion of the supporting members located on the exterior of the body when the supporting members are moved inward with respect to the body.

7. A parachute dummy in the shape of the torso of a person's body having leg portions extending from the lower end of said body and a web of substantially rigid material extending between said leg portions and secured thereto.

WILLIAM U. HOHWIELER.